United States Patent
Kang et al.

(10) Patent No.: US 12,225,189 B2
(45) Date of Patent: *Feb. 11, 2025

(54) IMAGE ENCODING/DECODING METHOD AND APPARATUS AND RECORDING MEDIUM FOR STORING BITSTREAM

(71) Applicant: Electronics and Telecommunications Research Institute, Daejeon (KR)

(72) Inventors: Jung Won Kang, Daejeon (KR); Sung Chang Lim, Daejeon (KR); Hyun Suk Ko, Daejeon (KR); Ha Hyun Lee, Seoul (KR); Jin Ho Lee, Daejeon (KR); Dong San Jun, Daejeon (KR); Seung Hyun Cho, Daejeon (KR); Hui Yong Kim, Daejeon (KR); Jin Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,515

(22) Filed: Jan. 12, 2024

(65) Prior Publication Data

US 2024/0155110 A1 May 9, 2024

Related U.S. Application Data

(63) Continuation of application No. 18/094,456, filed on Jan. 9, 2023, now Pat. No. 11,936,853, which is a
(Continued)

(30) Foreign Application Priority Data

Oct. 11, 2016 (KR) .................. 10-2016-0131269
Apr. 18, 2017 (KR) .................. 10-2017-0049993

(51) Int. Cl.
*H04N 19/105* (2014.01)
*H04N 19/119* (2014.01)
(Continued)

(52) U.S. Cl.
CPC ........ *H04N 19/105* (2014.11); *H04N 19/119* (2014.11); *H04N 19/159* (2014.11);
(Continued)

(58) Field of Classification Search
None
See application file for complete search history.

(56) References Cited

U.S. PATENT DOCUMENTS

2011/0249743 A1  10/2011 Zhao et al.
2013/0188740 A1  7/2013 Lim et al.
(Continued)

FOREIGN PATENT DOCUMENTS

JP  2016-116224 A  6/2016
KR  10-2007-0047523 A  5/2007
(Continued)

*Primary Examiner* — Daniel T Tekle
(74) *Attorney, Agent, or Firm* — NSIP Law

(57) ABSTRACT

The present invention relates to an image encoding method and an image decoding method. The image decoding method includes partitioning a picture into a plurality of coding units, constructing a coding unit group including at least one coding unit of the plurality of coding units, obtaining coding information in units of one coding unit group, and decoding at least one coding unit of the plurality of coding units included in the coding unit group by using the obtained coding information.

3 Claims, 8 Drawing Sheets

Related U.S. Application Data continuation of application No. 16/338,011, filed as application No. PCT/KR2017/011092 on Sep. 27, 2017, now Pat. No. 11,575,885.

(51) Int. Cl.
*H04N 19/159* (2014.01)
*H04N 19/176* (2014.01)
*H04N 19/186* (2014.01)
*H04N 19/70* (2014.01)
*H04N 19/96* (2014.01)

(52) U.S. Cl.
CPC ......... *H04N 19/176* (2014.11); *H04N 19/186* (2014.11); *H04N 19/70* (2014.11); *H04N 19/96* (2014.11)

(56) References Cited

U.S. PATENT DOCUMENTS

| | | | |
|---|---|---|---|
| 2014/0169452 A1* | 6/2014 | Lim | H04N 19/127 375/240.03 |
| 2014/0355686 A1* | 12/2014 | Takehara | H04N 19/503 375/240.16 |
| 2014/0362919 A1 | 12/2014 | Zhou et al. | |
| 2018/0176596 A1* | 6/2018 | Jeong | H04N 19/176 |
| 2019/0045221 A1* | 2/2019 | Min | H04N 19/139 |

FOREIGN PATENT DOCUMENTS

| | | |
|---|---|---|
| KR | 10-0772576 B1 | 11/2007 |
| KR | 10-2009-0103675 A | 10/2009 |
| KR | 10-2014-0101327 A | 8/2014 |
| KR | 10-2015-0069567 A | 6/2015 |
| KR | 10-2015-0071003 A | 6/2015 |
| KR | 10-1559875 B1 | 10/2015 |
| KR | 10-2424240 B1 | 7/2022 |

\* cited by examiner

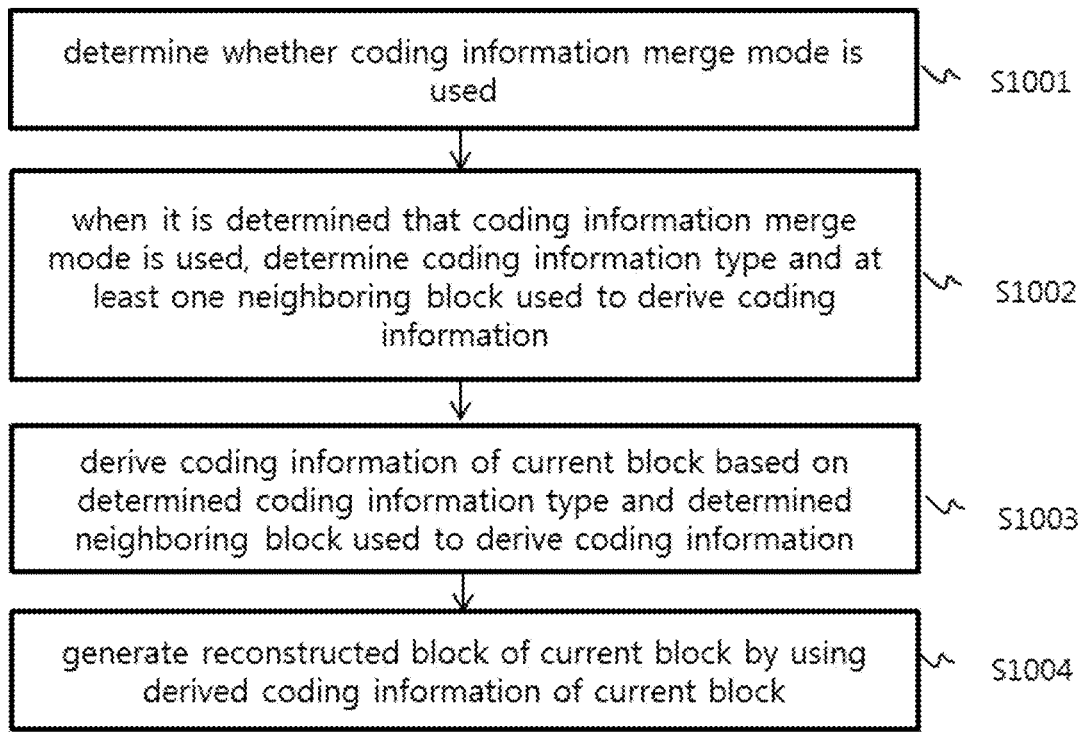

IMAGE ENCODING/DECODING METHOD AND APPARATUS AND RECORDING MEDIUM FOR STORING BITSTREAM

CROSS REFERENCE TO RELATED APPLICATIONS

This application is a Continuation application of U.S. patent application Ser. No. 18/094,456, filed on Jan. 9, 2023, which is a Continuation Application of U.S. patent application Ser. No. 16/338,011, filed on Mar. 29, 2019, now U.S. Pat. No. 11,575,885, issued on Feb. 7, 2023, which is a U.S. National Stage Application of International Application No. PCT/KR2017/011092, filed on Sep. 27, 2017, which claims the benefit under 35 USC 119(a) and 365(b) of Korean Patent Application No. 10-2016-0131269, filed on Oct. 11, 2016, and Korean Patent Application No. 10-2017-0049993, filed on Apr. 18, 2017, in the Korean Intellectual Property Office.

TECHNICAL FIELD

The present invention relates to an image encoding method, an image decoding method, an image encoding apparatus, an image decoding apparatus, and a recording medium storing a bitstream. More particularly, the present invention relates to an image encoding method, an image decoding method, an image encoding apparatus, and an image decoding apparatus using a method of efficiently signaling coding information, and to a recording medium storing a bitstream generated by the image encoding method and the image encoding apparatus.

BACKGROUND ART

Conventional image encoding/decoding methods and apparatuses limitedly use information of neighboring coding blocks when transmitting coding information required for encoding or decoding on a block basis. Therefore, there is limit in improving encoding efficiency with the conventional image encoding/decoding methods and apparatuses.

DISCLOSURE

Technical Problem

Accordingly, an objective of the present invention is to provide an image encoding method, an image decoding method, an image encoding apparatus, and an image decoding apparatus that provide high compression efficiency.

Another objective of the present invention is to provide an image encoding/decoding method of encoding/decoding coding information commonly applied to a plurality of blocks, to improve image encoding/decoding efficiency.

A further objective of the present invention is to provide an image encoding/decoding method and apparatus for deriving coding information of a current block by using coding information of a neighboring block, to improve image encoding/decoding efficiency.

Technical Solution

The prevent invention provides an image decoding method including: including: dividing a picture into a plurality of coding units; constructing a coding unit group including at least one coding unit of the plurality of coding units; obtaining coding information in units of one coding unit group; and decoding at least one coding unit of the plurality of coding units included in the coding unit group by using the obtained coding information.

In the image decoding method, the dividing a picture into a plurality of coding units includes dividing the picture into the plurality of coding units by using at least one of a quad-tree partitioning scheme and a binary-tree partitioning scheme, wherein the coding units correspond to leaf nodes in at least one of a quad-tree structure and a binary-tree structure.

In the image decoding method, the coding information that is obtained in the units of one coding unit group is information required for at least one of a prediction method, intra-picture prediction, inter-picture prediction, primary transform, secondary transform, dequantization, and in-loop filtering.

In the image decoding method, a size of the coding unit is expressed as at least one of a block size, the number of samples of a luma signal or a chroma signal, and a partition depth, and a largest size or a smallest size of the coding group unit is signaled as a slice header.

In the image decoding method, the constructing a coding unit group includes constructing a coding unit group including coding units that are consecutive in encoding order and to which an identical prediction mode is applied.

In the image decoding method, the constructing a coding unit group includes constructing a coding unit group including coding units corresponding to leaf nodes whose upper root nodes are a same node.

In the image decoding method, the constructing a coding unit group includes constructing a coding unit group by selecting one or more coding units to which an identical prediction mode is applied among coding units corresponding to leaf nodes whose upper root nodes are a same node.

In the image decoding method, the obtaining coding information in units of one coding unit group includes obtaining the coding information based on information on a type of the coding information transmitted in the units of one coding unit group.

In the image decoding method, the constructing a coding unit group may further include constructing a coding information transmission unit including at least one coding unit group, wherein the obtaining coding information in units of one coding unit group comprises obtaining the coding information in the units of one coding unit group, from coding information that is signaled in units of one coding information transmission unit.

The present invention provides an image encoding method including dividing a picture into a plurality of coding units; constructing a coding unit group including at least one coding unit of the plurality of coding units; and signaling coding information in units of one coding unit group.

The present invention provides a recording medium storing a bitstream generated through the image encoding method.

The present invention provides an image decoding method including determining whether a coding information merge mode is used; determining a coding information type and at least one neighboring block among a plurality of neighboring blocks used to derive coding information, when it is determined that the coding information merge mode is used; deriving coding information of the current block by using the determined coding information type and at least one of the determined neighboring blocks used to derive the coding information; and generating a reconstructed block of the current block based on the derived coding information of the current block.

In the image decoding method, the coding information type is determined based on information indicating a coding information type that is signaled.

In the image decoding method, the neighboring blocks used to derive the coding information is selected among neighboring blocks spatially adjacent to the current block and neighboring blocks temporally adjacent to the current block.

The present invention provides an image encoding method including determining a coding information type and at least one neighboring block of a plurality of neighboring blocks used to derive coding information; deriving coding information of a current block by using the determined coding information type and at least one of the determined neighboring blocks used to derive the coding information; and generating a reconstructed block of the current block based on the derived coding information of the current block.

The present invention provides a recording medium storing a bitstream generated through the image encoding method.

Advantageous Effects

As described above, the present invention can provide an image encoding/decoding method and apparatus that provide high compression efficiency.

The present invention can provide an image encoding/decoding method and apparatus that encode/decode coding information commonly applied to a plurality of blocks, to improve image encoding/decoding efficiency.

The present invention can provide an image encoding/decoding method and apparatus that derive coding information of a current block by using coding information of a neighboring block, to improve image encoding/decoding efficiency.

DESCRIPTION OF DRAWINGS

FIGS. 5 to 7 are diagrams illustrating an encoding sequence of coding units and prediction modes of the coding units and used to describe a method of constructing a coding unit group, according to one embodiment of the present invention;

FIG. 9 is a diagram used to describe a method of transmitting coding information by using a coding information transmission unit, according to one embodiment of the present invention;

FIG. 10 is a flowchart illustrating an image encoding method and an image decoding method using a coding information merge mode according to one embodiment of the present invention;

MODE FOR INVENTION

Figure 1:
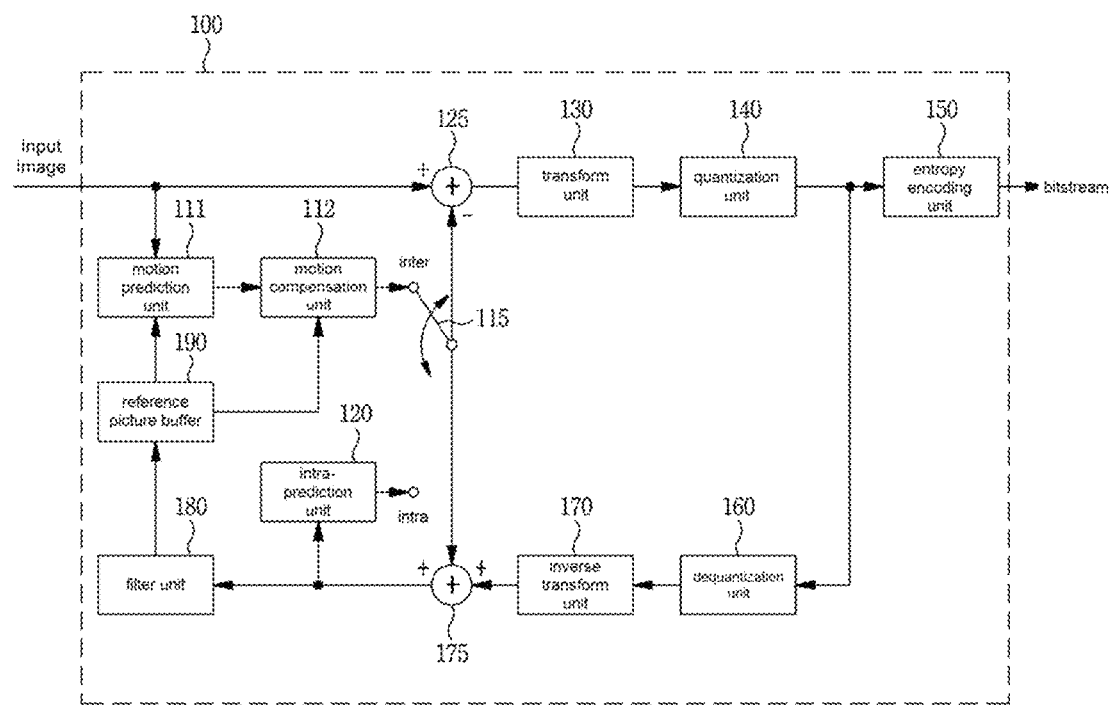
FIG. 1 is a block diagram illustrating the construction of an image encoding apparatus according to one embodiment of the present invention.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

In addition, hereinafter, an image may mean a picture configuring a video, or may mean the video itself. For example, "encoding or decoding or both of an image" may mean "encoding or decoding or both of a video", and may mean "encoding or decoding or both of one image among images of a video." Here, a picture and the image may have the same meaning.

DESCRIPTION OF TERMS

Encoder: means an apparatus performing encoding.
Decoder: means an apparatus performing decoding.

Block: means an M×N sample array. Herein, M and N mean positive integers, and the block may mean a sample array of a two-dimensional form. The block may refer to a unit. A current block my mean an encoding target block that becomes a target when performing encoding, or a decoding target block that becomes a target when performing decoding. In addition, the current block may be at least one of a coding block, a prediction block, a residual block, and a transform block.

Sample: is a basic unit constituting a block. It may be expressed as a value in a range of from 0 to 2Bd−1 according to a bit depth (Bd). In the present invention, the sample may have the same meaning as a pixel.

Unit: refers to a basic unit in image encoding and image decoding. When encoding and decoding an image, the unit may be a region generated by partitioning a single image. In addition, the unit may mean a subdivided unit when a single image is partitioned into subdivided units during encoding or decoding. When encoding and decoding an image, a predetermined process may be performed for each unit. A single unit may be partitioned into sub-units that have smaller sizes than the unit. Depending on functions, the unit may mean a block, a macroblock, a coding tree unit, a coding tree block, a coding unit, a coding block, a prediction unit, a prediction block, a residual unit, a residual block, a transform unit, a transform block, etc. In addition, in order to distinguish a unit from a block, the unit may include a luma component block, a chroma component block associated with the luma component block, and a syntax element of each color component block. The units may have various sizes and forms, and particularly, the form of the unit may be a two-dimensional geometrical figure such as a rectangular shape, a square shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is composed of one luma component coding tree block Y and two chroma component coding tree blocks Cb and Cr associated with the luma component coding tree block Y. In addition, it may be construed to include the blocks and syntax elements of the respective blocks. Each coding tree unit may be partitioned by using at least one of a quad-tree partitioning method and a binary-tree partitioning method to generate a lower-level unit such as a coding unit, a prediction unit, a transform unit, etc. It may be used as a term for designating a pixel block that becomes a unit for each process such as partitioning an input image when performing encoding/decoding.

Coding Tree Block: may be used as a term for designating any one of a Y coding tree block, a Cb coding tree block, and a Cr coding tree block.

Neighboring Block: means a block adjacent to a current block. The block adjacent to the current block may mean a block that comes into contact with a boundary of the current block, or a block positioned within a predetermined distance from the current block. The neighboring block may mean a block adjacent to a vertex of the current block. Herein, the block adjacent to the vertex of the current block may mean a block vertically adjacent to a neighboring block that is horizontally adjacent to the current block, or a block horizontally adjacent to a neighboring block that is vertically adjacent to the current block.

Reconstructed Neighboring Block: means a neighboring block that is spatially or temporally adjacent to a current block and which has been already encoded or decoded.

Herein, the reconstructed neighboring block may mean a reconstructed neighboring unit. A reconstructed spatial neighboring block may be a block that is disposed within a current picture and which has been already reconstructed through encoding and/or decoding. A reconstructed temporal neighbor block is a block that is disposed within a reference picture and located at the same position as the current block of the current picture, and which has been already reconstructed, or a neighboring block thereof.

Unit Depth: means a partitioned degree of a unit. In a tree structure, a root node may be the highest node, and a leaf node may be the lowest node. In addition, when a unit is expressed as a tree structure, a level in which a unit is present may mean a unit depth.

Bitstream: means a bit string including coded image information.

Parameter Set: corresponds to header information within the structure of a bitstream. At least one of a video parameter set, a sequence parameter set, a picture parameter set, and an adaptation parameter set may be included in a parameter set. In addition, a parameter set may include slice header information and tile header information.

Parsing: may mean determining a value of a syntax element by performing entropy decoding on a bitstream, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Unit: means a basic unit when performing prediction such as inter-picture prediction, intra-picture prediction, inter-picture compensation, intra-picture compensation, and motion compensation. A single prediction unit may be partitioned into a plurality of partitions with a smaller size, or may be partitioned into prediction sub-units with a smaller size.

Prediction Unit Partition: means a form obtained by partitioning a prediction unit.

Reference Picture List: means a list including one or more reference pictures used for inter-picture prediction or motion compensation. LC (List Combined), L0 (List 0), L1 (List 1), L2 (List 2), L3 (List 3) and the like are types of reference picture lists. One or more reference picture lists may be used for inter-picture prediction.

Inter-picture prediction Indicator: may mean an inter-picture prediction direction (uni-directional prediction, bi-directional prediction, and the like) of a current block. Alternatively, the inter-picture prediction indicator may mean the number of reference pictures used to generate a prediction block of a current block. Further alternatively, the inter-picture prediction indicator may mean the number of prediction blocks used to perform inter-picture prediction or motion compensation with respect to a current block.

Reference Picture Index: means an index indicating a specific reference picture in a reference picture list.

Reference Picture: may mean a picture to which a specific block refers for inter-picture prediction or motion compensation.

Motion Vector: is a two-dimensional vector used for inter-picture prediction or motion compensation and may mean an offset between a reference picture and an encoding/decoding target picture. For example, (mvX, mvY) may represent a motion vector, mvX may represent a horizontal component, and mvY may represent a vertical component.

Motion Vector Candidate: may mean a block that becomes a prediction candidate when predicting a motion vector, or a motion vector of the block. A motion vector candidate may be listed in a motion vector candidate list.

Motion Vector Candidate List: may mean a list of motion vector candidates.

Motion Vector Candidate Index: means an indicator indicating a motion vector candidate in a motion vector candidate list. It is also referred to as an index of a motion vector predictor.

Motion Information: may mean information including a motion vector, a reference picture index, an inter-picture prediction indicator, and at least any one among reference picture list information, a reference picture, a motion vector candidate, a motion vector candidate index, a merge candidate, and a merge index.

Merge Candidate List: means a list composed of merge candidates.

Merge Candidate: means a spatial merge candidate, a temporal merge candidate, a combined merge candidate, a combined bi-prediction merge candidate, a zero merge candidate, or the like. The merge candidate may have an inter-picture prediction indicator, a reference picture index for each list, and motion information such as a motion vector.

Merge Index: means information indicating a merge candidate within a merge candidate list. The merge index may indicate a block used to derive a merge candidate, among reconstructed blocks spatially and/or temporally adjacent to a current block. The merge index may indicate at least one item in the motion information possessed by a merge candidate.

Transform Unit: means a basic unit used when encoding or decoding a residual signal, for example, when performing transform, reverse transform, quantization, dequantization, or transform coefficient encoding/decoding. One transform unit may be partitioned into a plurality of smaller transform units.

Scaling: means a process of multiplying a transform coefficient level by a factor. A transform coefficient may be generated by scaling a transform coefficient level. The scaling also may be referred to as dequantization.

Quantization Parameter: may mean a value used when generating a transform coefficient level of a transform coefficient during quantization. The quantization parameter also may mean a value used when generating a transform coefficient by scaling a transform coefficient level during dequantization. The quantization parameter may be a value mapped on a quantization step size.

Delta Quantization Parameter: means a difference value between a predicted quantization parameter and a quantization parameter of an encoding/decoding target unit.

Scan: means a method of sequencing coefficients within a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: means a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: means a transform coefficient having a value other than zero, or a transform coefficient level having a value other than zero.

Quantization Matrix: means a matrix used in a quantization process or a dequantization process performed to improve subjective or objective image quality. The quantization matrix also may be referred to as a scaling list.

Quantization Matrix Coefficient: means each element within a quantization matrix. The quantization matrix coefficient also may be referred to as a matrix coefficient.

Default Matrix: means a predetermined quantization matrix preliminarily defined in an encoder or a decoder.

Non-default Matrix: means a quantization matrix that is not preliminarily defined in an encoder or a decoder but is signaled by a user.

FIG. 1 is a block diagram illustrating the construction of an encoding apparatus according to one embodiment of the present invention.

An encoding apparatus 100 may be an encoder, a video encoding apparatus, or an image encoding apparatus. A video may include one or more images (or pictures). The encoding apparatus 100 can sequentially encode one or more pictures.

With reference to FIG. 1, the encoding apparatus 100 includes a motion prediction unit 111, a motion compensation unit 112, an intra-prediction unit 120, a switch 115, a subtractor 125, a transform unit 130, a quantization unit 140, an entropy encoding unit 150, a dequantization unit 160, a reverse-transform unit 170, an adder 175, a filter unit 180, and a reference picture buffer 190.

The encoding apparatus 100 can perform encoding on an input picture using an intra mode and/or an inter mode. The encoding apparatus 100 may generate a bitstream by encoding an input picture and output the generated bitstream. The generated bitstream may be recorded on a computer-readable recording medium or streamed via a wired or wireless transmission medium. When an intra mode is used as a prediction mode, the switch 115 may be switched to intra. Meanwhile, when an inter mode is used as a prediction mode, the switch 115 may be switched to inter. Here, the intra mode may mean an intra-picture prediction mode, and the inter mode may mean an inter-picture prediction mode. The encoding apparatus 100 may generate a prediction block of an input block of an input picture. After the prediction block is generated, the encoding apparatus 100 may encode a residual between the input block and the prediction block. The input picture can be referred to as a current picture that is an encoding target picture to undergo current encoding. The input block can be referred to as a current block or an encoding target block to undergo current encoding.

When the prediction mode is the intra mode, the intra-prediction unit 120 may use a pixel value of a neighboring block that has been already encoded or decoded as a reference pixel. The intra-prediction unit 120 may perform spatial prediction on the input block by using the reference pixel, and generate prediction samples of the input block through the spatial prediction. Here, the intra-prediction may mean intra-picture prediction.

When the prediction mode is the inter mode, the motion prediction unit 111 may search a reference picture for a region that best matches the input block during a motion prediction process, and derive a motion vector using the searched region. The reference picture may be stored in the reference picture buffer 190.

The motion compensation unit 112 may generate a prediction block by performing motion compensation using a motion vector. Here, the inter-prediction may mean inter-picture prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference between the input block and the prediction block. The residual block may be referred to as a residual signal. The residual signal may mean a difference between an original signal and a prediction signal. Alternatively, the residual signal may mean a signal obtained by transforming, or quantizing, or transforming and quantizing the difference between the original signal and the prediction signal. The residual block may be a residual signal obtained in the units of a block.

The transform unit 130 may generate a transform coefficient by transforming the residual block, and may output the generated transform coefficient. Here, the transform coefficient may be a coefficient value generated by transforming the residual block. When the transform skip mode is used, the transform unit 130 may not perform the transform on the residual block.

A quantized level may be generated by applying quantization to the transform coefficient or the residual signal. Hereinafter, the quantized level also may be referred to as the transform coefficient in the embodiment of the present invention.

The quantization unit 140 may generate the quantized level by quantizing the transform coefficient or the residual signal depending on the quantization parameter, and may output the quantized level. Here, the quantization unit 140 may quantize the transform coefficient by using a quantization matrix.

The entropy encoding unit 150 may generate a bitstream by performing entropy encoding according to probability distribution, on values calculated by the quantization unit 140 or on coding parameter values calculated in an encoding process, etc., and may output the generated bitstream. The entropy encoding unit 150 also may perform entropy encoding on information on a pixel of an image and information on image decoding. For example, the information on image decoding may include a syntax element, etc.

When entropy encoding is applied, symbols are represented such that a smaller number of bits are allocated to symbols having a higher occurrence probability and a larger number of bits are allocated to symbols having a lower occurrence probability. Thereby the size of the bitstream of encoding target symbols can be reduced. For the entropy encoding, the entropy encoding unit 150 may use an encoding method such as exponential Golomb, context-adaptive variable length coding (CAVLC), or context-adaptive binary arithmetic coding (CABAC). For example, the entropy encoding unit 150 may perform entropy encoding by using a variable length coding/code (VLC) table. In addition, the entropy encoding unit 150 may derive a binarization method of a target symbol and a probability model of a target symbol/bin, and may perform arithmetic coding by using the derived binarization method, the derived probability model, or the derived context model thereafter.

In order to encode the transform coefficient level, the entropy encoding unit 150 may change a two-dimensional block form coefficient into a one-dimensional vector form coefficient by using a transform coefficient scanning method.

The coding parameters may include not only information (flag, index, etc.), such as a context syntax, which is encoded by the encoder and is signaled to the decoder but also information derived during an encoding process or a decoding process. The coding parameters may further include information that is required when encoding or decoding an image. For example, the coding parameters may include at least any one of or at least one combination of a unit or block size, a unit or block depth, unit or block partition information, a unit or block partition structure, information about whether quad-tree form partitioning is performed, information about whether binary-tree form portioning is performed, a direction (horizontal direction or vertical direction) of binary-tree form partitioning, a partition type of a binary-tree form (symmetric partition or asymmetric partition), a mode of intra-picture prediction, a direction of intra-picture prediction, a reference sample filtering method, a prediction block filtering method, a prediction block filter tap, a prediction block filter coefficient, a mode of inter-picture prediction, motion information, a motion vector, a reference picture index, a direction of inter-picture prediction, an inter-picture prediction indicator, a reference picture list, a reference picture, a motion vector prediction candidate, a motion vector candidate list, information about whether or not a motion merge mode is used, a merge candidate, a merge candidate list, information about whether or not a kip mode is used, an interpolation filter type, an interpolation filter tap, an interpolation filter coefficient, a motion vector size, a motion vector representation, accuracy of a motion vector representation, a transform type, a transform size, information about whether primary transform is used, information about whether secondary transform is used, a primary transform index, a secondary transform index, information about whether or not a residual signal is present, a coded block pattern, a coded block flag, a quantization parameter, a quantization matrix, information about whether an intra-loop filter is applied, an intra-loop filter coefficient, an intra-loop filter tap, shape/form of an intra-loop filter, information about whether a deblocking filter is applied, a deblocking filter coefficient, a deblocking filter tap, a deblocking filter intensity, shape/form of a deblocking filter, information about whether an adaptive sample offset is applied, an adaptive sample offset value, an adaptive sample offset category, an adaptive sample offset type, information about whether an adaptive in-loop filter is applied, an adaptive in-loop filter coefficient, an adaptive in-loop filter tap, shape/form of an adaptive in-loop filter, a binarization/inverse binarization method, a context model determination method, a context model updating method, information about whether a regular mode is performed, information about whether a bypass mode is performed, a context bin, a bypass bin, a transform coefficient, a transform coefficient level, a transform coefficient level scanning method, a display/output order of images, slice identification information, a slice type, slice partition information, tile identification information, a tile type, tile partition information, a picture type, a bit depth, and information about a luma signal or a chroma signal.

Herein, the expression 'signaling a flag or an index' means an operation that a flag or an index is subjected to entropy encoding and is then added to the bitstream in the encoder, or an operation that a flag or an index included in a bitstream is subjected to entropy decoding in the decoder.

When the encoding apparatus 100 performs encoding based on inter-picture prediction, an encoded current picture may be used as a reference picture for encoding of another picture. Accordingly, the encoding apparatus 100 may reconstruct or decode the encoded current picture, and may store the reconstructed or decoded picture as a reference picture.

A quantized level may be dequantized by the dequantization unit 160, and may be inversely transformed by the inverse transform unit 170. The dequantized and inversely transformed coefficient may be added to the prediction block by the adder 175. A reconstructed block can be generated by adding the dequantized or inversely transformed coefficient to the prediction block. Herein, the dequantized and/or inversely transformed coefficient may mean a coefficient which has undergone dequantization, inverse transform, or both, or alternatively mean a reconstructed residual block.

The reconstructed block may pass the filter unit 180. The filter unit 180 may apply at least one of a deblocking filter, a sample adaptive offset (SAO) filter, and an adaptive loop filter (ALF) to the reconstructed block or the reconstructed picture. The filter unit 180 may be referred to as an in-loop filter.

The deblocking filter may remove block distortion that occurs at the boundaries between the blocks. When determining whether to apply the deblocking filter, a determination of whether to apply the deblocking filter to the current block is performed based on the pixels included in several rows or columns in the current block. When the deblocking filter is applied, a strong filter or a weak filter may be applied depending on required deblocking filtering strength.

The sample adaptive offset may be used to add an optimum offset value to the pixel value in order to compensate for an encoding error. The sample adaptive offset may correct an offset between the deblocking-filtered picture and the original picture in the units of a pixel. In order to perform the offset correction on a specific picture, it is possible to use a method of dividing the pixels of an image into a predetermined number of regions, determining a region to undergo the offset correction, and applying the offset correction to the determined region, or a method of applying an offset in consideration of edge information of each pixel.

The adaptive loop filter may perform filtering on the basis of a value obtained by comparing the reconstructed picture and the original picture. The pixels of an image may be partitioned into a predetermined number of groups, and one filter to be applied to a corresponding group of the groups is determined. In this way, different filters may be applied to the groups. Information about whether or not to apply the adaptive loop filter is may be signaled for each coding unit (CU). The shape and filter coefficient of an adaptive loop filter being applied to each block may vary.

The reconstructed block or the reconstructed picture that has passed through the filter unit 180 may be stored in the reference picture buffer 190.

Figure 2:
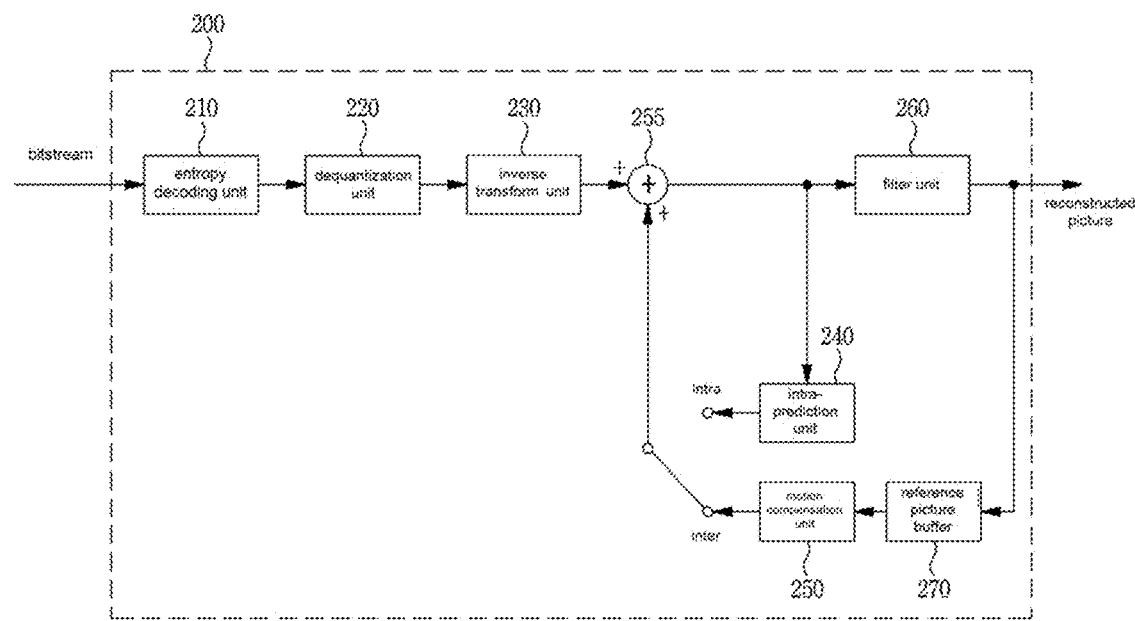
FIG. 2 is a block diagram illustrating the construction of an image decoding apparatus according to one embodiment of the present invention.

FIG. 2 is a block diagram illustrating the construction of a decoding apparatus according to an embodiment of the present invention.

The decoding apparatus 200 may be a decoder, a video decoding apparatus, or an image decoding apparatus.

Referring to FIG. 2, the decoding apparatus 200 may include an entropy decoding unit 210, a dequantization unit 220, a reverse-transform unit 230, an intra-prediction unit 240, a motion compensation unit 250, an adder 255, a filter unit 260, and a reference picture buffer 270.

The decoding apparatus 200 may receive a bitstream output from the encoding apparatus 100. The decoding apparatus 200 may receive a bitstream read out from a computer readable recording medium, or a bitstream streamed through a wired or wireless transmission medium. The decoding apparatus 200 may decode the bitstream using the intra mode or the inter mode. The decoding apparatus 200 may generate a reconstructed picture or a decoded picture by performing decoding, and may output the reconstructed picture or the decoded picture.

When a prediction mode used for the decoding is the intra mode, the switch may be switched to intra. Meanwhile, when the prediction mode used for the decoding is the inter mode, the switch may be switched to inter.

The decoding apparatus 200 may acquire a reconstructed residual block by decoding an input bitstream, and may generate a prediction block. When the reconstructed residual block and the prediction block are acquired, the decoding apparatus 200 may generate a reconstructed block, which is a decoding target block, by adding the reconstructed residual block and the prediction block. The decoding target block may be referred to as a current block.

The entropy decoding unit 210 performs entropy decoding on the bitstream according the probability distribution, thereby generating symbols. The generated symbols may include a symbol of a quantized level form. Here, the entropy decoding method may be a reverse process of the above-described entropy encoding method.

In order to decode the transform coefficient level, the entropy decoding unit 210 may perform transform coefficient scanning, thereby changing coefficients of a one-dimensional vector form into coefficients of a two-dimensional block form.

The quantized level may be dequantized by the dequantization unit 220, and may be inversely transformed by the inverse transform unit 230. When the quantized level is dequantized and/or inversely transformed, a reconstructed residual block is generated. Here, the dequantization unit 220 may apply a quantization matrix to the quantized level.

When the intra mode is used, the intra-prediction unit 240 may generate a prediction block by performing spatial prediction using a pixel value of a previously decoded block that is adjacent to a decoding target block.

When the inter mode is used, the motion compensation unit 250 may generate a prediction block by performing motion compensation using both the motion vector and the reference picture stored in the reference picture buffer 270. When the value of the motion vector is not an integer, the motion compensation unit 250 may generate the prediction block by applying the interpolation filter to a partial region of a reference picture. In order to perform motion compensation on a coding unit, it may be first determined that which mode among a skip mode, a merge mode, an AMVP mode, and a current picture reference mode is to be used for motion compensation of a prediction unit included in the corresponding coding unit, and the motion compensation may then be performed according to the determined mode.

The adder 255 may generate a reconstructed block by adding the reconstructed residual block and the prediction block. The filter unit 260 may apply at least one of the deblocking filter, the sample adaptive offset, and the adaptive loop filter to the reconstructed block or the reconstructed picture. The filter unit 260 may output the reconstructed picture. The reconstructed block or the reconstructed picture may be stored in the reference picture buffer 270 and may be used for inter-prediction thereafter.

Figures 3, 4:
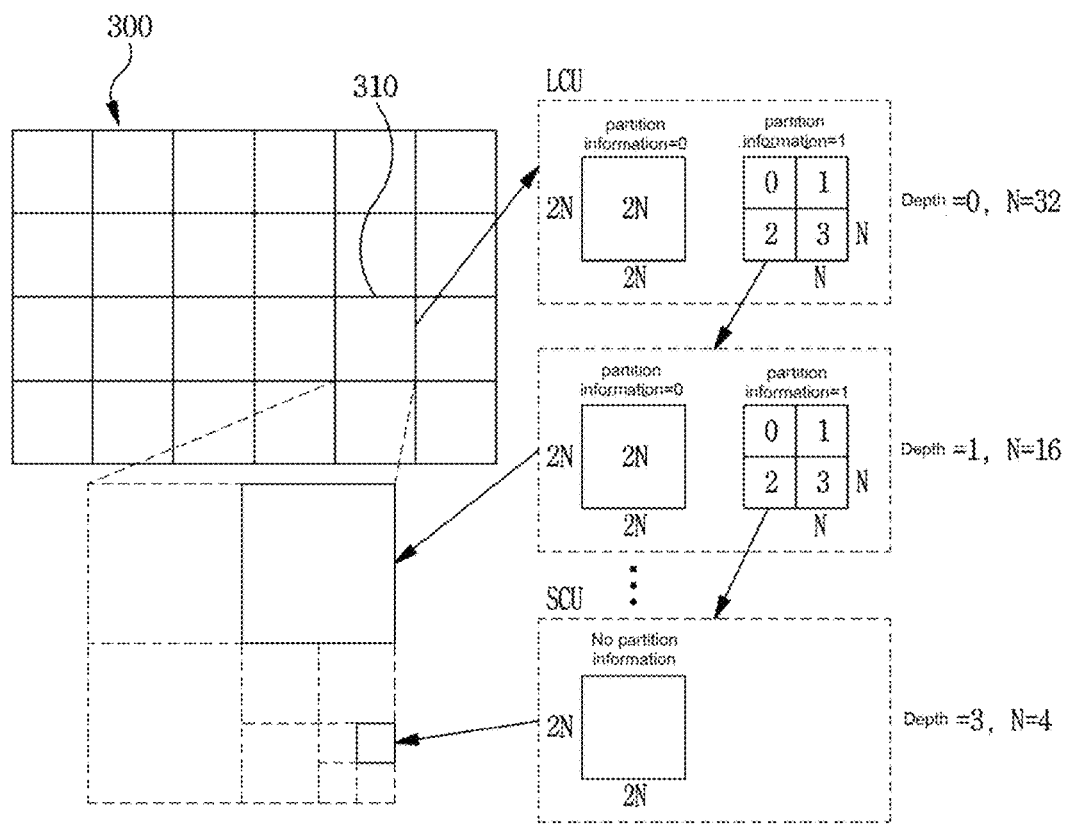
FIG. 3 is a diagram schematically illustrating a partitioned structure of an image when encoding or decoding the image.
FIG. 4 is a diagram illustrating an encoding sequence of coding units and used to describe a method of constructing a coding unit group according to one embodiment of the present invention.

FIG. 3 is a diagram schematically illustrating a partition structure of an image for encoding or decoding the image. FIG. 3 schematically illustrates an embodiment in which one unit is partitioned into a plurality of sub-units.

In order to efficiently partition an image, a coding unit (CU) may be used in encoding and decoding. Here, the coding unit may be used as a basic unit for image encoding and image decoding. The coding unit also may be a unit for which the intra-picture mode or the inter-picture mode is determined when image encoding or decoding is performed. The coding unit may be a basic unit used for prediction, transform, quantization, inverse transform, dequantization, or transform coefficient encoding/decoding.

Referring to FIG. 3, a picture 300 is sequentially partitioned into largest coding units (LCUs), and a partition structure is determined for each LCU. Here, an LCU and a coding tree unit (CTU) may have the same meaning. Partitioning a unit may mean partitioning a block corresponding to the unit. Block partition information may include unit depth information. The depth information may indicate the number of times a unit is partitioned, a partitioned degree of a unit, or both. One unit may have depth information based on a tree structure and may be hierarchically partitioned. Each of the partitioned sub-units may have depth information. The depth information may be information about the size of a CU and may be stored for each CU.

The partition structure may mean the distribution of coding units (CU) in an LCU 310. The distribution may be determined depending on whether or not one CU will be partitioned into a plurality of (a positive integer equal to or greater than 2, such as, 2, 4, 8, 16, etc) CUs. The width and the length of the partitioned CU (sub-CU) may be respectively half the width and half the length of the original CU. The width and the length of each partitioned CU may be respectively smaller than the width and the length of the original CU, and are dependent on the number of partitioned CUs. The partitioned CU may be recursively partitioned into a plurality of further partitioned CUs. The partitioning may be recursively performed until a finally partitioned CU has a predefined depth or a predefined size. For example, the depth of the LCU may be zero. Alternatively, the depth of a smallest coding unit (SCU) may be a predefined maximum depth. Here, the LCU may be a coding unit having a maximum coding unit size as described above, and the SCU may be a coding unit having a minimum coding unit size. The partitioning starts from the LCU 310. Whenever the width and the length of the CU are decreased through the partitioning, the depth of a CU is incremented by one.

Information about whether a CU will be partitioned is represented as the partition information of a CU. The partition information may be 1-bit information. All of the CUs except the SCUs may have their own partition information. For example, one CU may not be partitioned when the value of the partition information of the CU is 1, but may be partitioned when the value of the partition information of the CU is 2.

Referring to FIG. 3, the LCU having a depth of 0 may be a block of 64×64 pixels. The value '0' may represent the minimum depth. The SCU having a depth of 3 may be a block of 8×8 pixels. The value '3' may be the maximum depth. A 32×32-pixel block and a 16×16-pixel block may be respectively represented to have a depth of 1 and a depth of 2.

For example, when one coding unit is partitioned into four smaller coding units, each of the partitioned four coding units has a width and a length that are respectively half the width and half the length of the original coding unit. For example, when one coding unit having a size of 32×32 pixels is partitioned into four smaller coding units, each of the partitioned four smaller coding units has a size of 16×16 pixels. When one coding unit is partitioned into four smaller coding units, it means that the coding unit is partitioned in a quad-tree form.

For example, when one coding unit is partitioned into two smaller coding units, each of the partitioned smaller coding units has a width or a length that is half the width or half the length of the original coding unit. For example, when one coding unit having a size of 32×32 pixels is partitioned into two smaller coding units, each of the partitioned smaller coding units has a size of 16×32 pixels. When one coding unit is partitioned into two smaller coding units, it means that the coding unit is partitioned in a binary-tree form. In FIG. 3, an LCU 320 is an example of an LCU to which both of the binary-tree form partitioning and the quad-tree form partitioning are applied.

Based on the above description, a method of efficiently signaling coding information will be described below. Herein, the term "coding information" is information required for image encoding/decoding. Specifically, the coding information may be information required for encoding or decoding, that is, information required for a prediction method, intra-picture prediction, inter-picture prediction, primary transform, secondary transform, quantization, and in-loop filtering. The coding information may mean the coding parameters described above. Examples of the coding information will be described below.

(1) Coding information indicating a prediction method: at least one of prediction mode information indicating intra-picture prediction or inter-picture prediction, and prediction skip information.

(2) Coding information required for intra-picture prediction: at least one of information indicating whether a mode that is the same as an intra-picture prediction mode of a current coding unit exists in an MPM list, information indicating an intra-picture prediction mode of the current encoding unit, among intra-picture prediction modes included in the MPM list, intra-picture prediction mode information of the current coding unit, information indicating an intra-picture prediction mode of a chroma signal, a reference line identifier used to identify a reference line used for intra-picture prediction among a plurality of reference lines, and information on skipping of intra-picture prediction.

Here, the most probable mode (MPM) list may mean a list including an intra-picture prediction mode of at least one spatial neighboring block or may mean a list including at least one intra-picture prediction mode of a predetermined number of intra-picture prediction modes.

(3) Coding information required for inter-picture prediction: at least one of a motion vector, a reference picture index, an inter-picture prediction indicator, information of whether or not a skip mode is used (skip flag), information of whether or not a merge mode is used (merge flag), merge index information (merge index), motion vector resolution information, overlapped block motion compensation information, local illumination compensation information, affine motion compensation, decoder-side motion vector derivation information (or pattern matched motion vector derivation information), and bi-directional optical flow information.

Here, the motion vector resolution information may be information regarding whether a specific resolution is used for at least one of a motion vector and a motion vector difference value. In this case, the resolution may mean precision. In addition, a specific resolution may be at least any one of an integer pixel unit (integer-pel), a half pixel unit (½-pel), a quad pixel unit (¼-pel), a ⅛-pixel unit (⅛-pel), a 1/16-pixel unit (1/16-pel), a 1/32-pixel unit (1/32-pel), and a 1/64-pixel unit (1/64-pel).

The overlapped block motion compensation information may mean information indicating whether a pixel value of a neighboring block spatially adjacent to an encoding or decoding target block is used when performing motion compensation on the encoding or decoding target block.

The local illumination compensation information may mean information indicating whether at least one of a weighted value and an offset value is used when generating a prediction block of the encoding or decoding target block. At least one of the weighted value and the offset value may be a value calculated based on a reference block.

The affine motion compensation information may be information indicating whether an affine motion model is used when performing motion compensation on the encoding or decoding target block. The affine motion model may be a method of partitioning one block into a plurality of sub-blocks using a plurality of parameters and of calculating a motion vector of the partitioned sub-block from a representative motion vector.

The decoder-side motion vector derivation information may be information indicating whether a motion vector required for motion compensation is derived and used by a decoder. Information on a motion vector may not be entropy-encoded or entropy-decoded. When the merge mode is used, a decoder-side motion vector derivation may be performed.

The bi-directional optical flow information may be information indicating whether motion compensation is performed with a motion vector being modified on a pixel basis. The motion vector in the units of a pixel may not be entropy-encoded or entropy-decoded. The motion vector modification is a process of changing the value of the motion vector on a pixel basis.

(4) Coding information required for primary transform: at least one of information indicating whether one fixed primary transform method is used and information indicating a primary transform method applied to a current coding block when there are one or more primary transform types.

(5) Coding information required for secondary transform: at least one of information indicating whether one fixed secondary transform method is used and information indicating a secondary transform method when there are one or more secondary transform types.

(6) Information required for quantization: at least one of a quantization parameter (QP) difference value, information indicating a change in a QP value applied to a chroma signal, and information indicating a difference value between a QP value applied to a chroma signal and a QP value applied to a luma signal.

(7) Coding information required for in-loop filtering (for example, ALF and SAO): at least one of an in-loop filter coefficient, information indicating whether an in-loop filter is applied, and information indicating an in-loop filter type that is used.

According to one embodiment of the present invention, a coding unit group may be defined for efficient signaling of coding information.

A coding unit group may mean a unit consisting of one or more coding units. For at least one coding unit of a plurality of coding units included in one coding unit group, at least one piece of the coding information may be signaled on a coding unit group basis.

Figures 5, 6, 7:
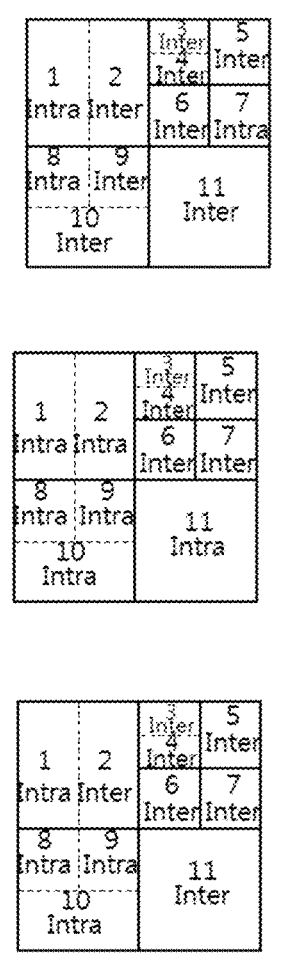
Figure 8:
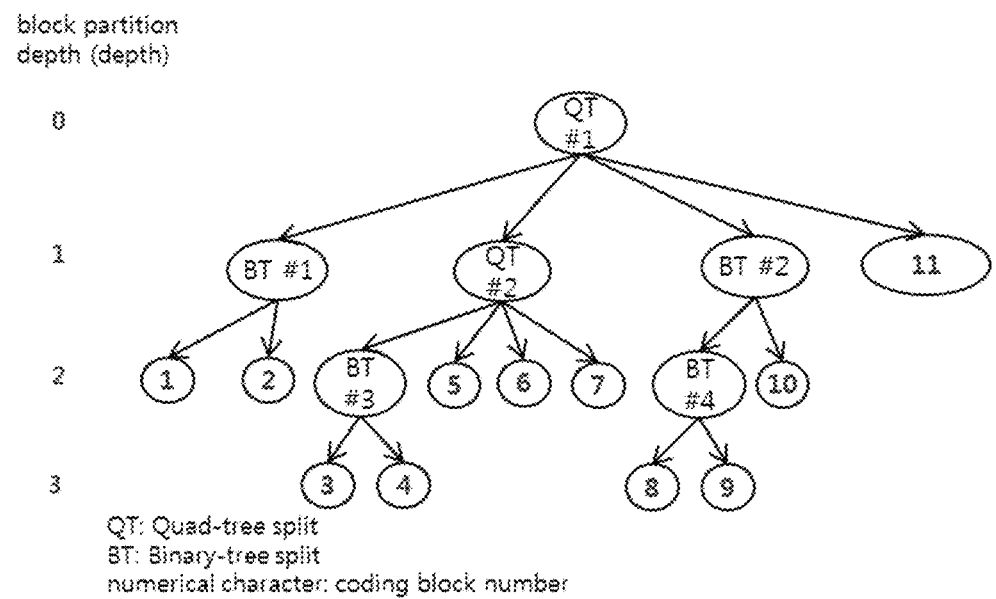
FIG. 8 is a diagram illustrating an encoding sequence and a depth of coding units obtained by partitioning a picture using a quad-tree portioning scheme and a binary-tree partitioning scheme, and used to describe a method of constructing a coding unit group according to one embodiment of the present invention.

Hereinbelow, a method of constructing one coding unit group according to one embodiment of the present invention will be described with reference to FIGS. 4 to 8. FIG. 4 is a diagram illustrating an encoding sequence of coding units, and FIGS. 5 to 7 are diagrams illustrating an encoding sequence of coding units and prediction modes of the coding units. FIG. 8 is a diagram illustrating an encoding sequence and a depth of coding units obtained by partitioning a picture using a quad-tree partitioning scheme and a binary-tree partitioning scheme. An encoder and a decoder may construct identical coding unit groups by using the coding unit group construction method.

The coding unit group may be constructed based on an encoding sequence, a prediction mode, a block form, and a block partition structure.

The coding unit group may consist of a plurality of coding units that are consecutive in encoding order. For example, referring to FIG. 4, the following four coding unit groups may be constructed: a group including coding units 1 and 2 (1, 2); a group including coding units 3, 4, 5, and 6 (3, 4, 5, 6); a group including coding units 7 and 8 (7, 8); and a group including coding units 9, 10, and 11 (9, 10, 11).

Each coding unit group may consist of coding units to which an identical prediction mode is applied. The prediction mode may be any one of an inter-picture prediction mode, an intra-picture prediction mode, and a prediction skip mode. However, the prediction mode may not be limited thereto but it may be an AMVP mode which is categorized as the inter-prediction mode or may be any one of a vertical mode, a horizontal mode, a DC mode, and a directional mode which are categorized as the intra-picture prediction mode.

The coding unit group may be constructed to have a rectangular form. In this case, for example, referring to FIG. 4, the following coding unit groups may be constructed: a group including coding units 1 and 2; a group including coding units 3, 4, and 5; a group including coding units 6 and 7; a group including coding units 8 and 9; a group including coding unit 10; and a group including coding unit 11 {(1, 2), (3, 4, 5), (6, 7), (8, 9), (10), (11)}. Alternatively, the following coding unit groups may be constructed: a group including a coding unit 1; a group including a coding unit 2; a group including coding units 3 and 4; a group including a coding unit 5; a group including coding units 8, 9, and 10; and a group including a coding unit 11 {(1), (2), (3, 4), (5), (6, 7), (8, 9, 10), (11)}. Further alternatively, the following coding unit groups may be constructed: a group including coding units 1, 2, 8, 9, and 10; a group including coding units 3, 4, and 6; a group a group including a coding unit 5; a group including a coding unit 7; and a group including a coding unit 11 {(1, 2, 8, 9, 10), (3, 4, 6), (5), (7), (11)}.

Each coding unit group may consist of coding units that are consecutive in encoding order and to which an identical prediction mode is applied. For example, referring to FIG. 5, the following five coding unit groups may be constructed: a group including a coding unit 1; a group including coding units 2, 3, and 4; a group including coding units 5 and 6; a group including coding units 7 and 8; and a group including coding units 9, 10, and 11 {(1), (2, 3, 4), (5, 6), (7, 8), (9, 10, 11)}.

Each coding unit group may consist of coding units each of which has a rectangular block form and to which an identical prediction mode is applied. For example, referring to FIG. 6, the following coding unit groups may be constructed: a group including coding units 1, and 2; a group including coding units 3, 4, and 5; a group including coding units 6 and 7; a group including coding units 8 and 9; a group including a coding unit 10; and a group including a coding unit 11 {(1, 2), (3, 4, 5), (6, 7), (8, 9), (10), (11)}. Alternatively, the following coding unit groups may be constructed: a group including a coding unit 1; a group including a coding unit 2; a group including coding units 3 and 4; a group including a coding unit 5; a group including coding units 6 and 7; a group including coding units 8, 9, and 10; and a group including a coding unit 11, {(1), (2), (3, 4), (5), (6, 7), (8, 9, 10), (11)}. Further alternatively, the following coding unit groups may be constructed: a group including coding units 1, 2, 8, 9, and 10; a group including coding units 3, 4, and 6; a group including a coding unit 5; a group including a coding unit 7; and a group including a coding unit 11 {(1, 2, 8, 9, 10), (3 4, 6), (5), (7), (11)}

The coding unit group may consist of coding units each of which has a rectangular block form, which are consecutive in encoding order, and to which an identical prediction mode is applied. For example, referring to FIG. 7, the following coding unit groups may be constructed: a group including a coding unit 1; a group including a coding unit 2; a group including coding units 3, 4, and 5; a group including coding units 6 and 7; a group including coding units 8, 9, 10, and 11 {(1), (2), (3, 4, 5), (6, 7), (8, 9, 10, 11)} Alternatively, the following coding unit groups may be constructed: a group including a coding unit 1; a group including a coding unit 2; a group including coding units 3, 4, 5, 6, and 7; a group including coding units 8, 9, and 10; and a group including a coding unit 11 {(1), (2), (3, 4, 5, 6, 7), (8, 9, 10), (11)}

The coding unit groups may be constructed based on a quad-tree plus binary-tree block partitioning scheme. Hereinbelow, a method of constructing coding unit groups based on the quad-tree plus binary-tree block partitioning scheme will be described with reference to FIG. 8.

A leaf node and a root node in a quad-tree plus binary-tree partition structure may be defined in a manner described below. When a leaf node corresponding to a coding unit has a block partition depth of K, an upper node that is in an upper level than the leaf node and has a block partition depth lower than that of the leaf node by one is referred to as a first root node of the leaf node. Further, an upper node that is in an upper level than the leaf node and has a block partition depth lower than that of the leaf node by n (which means that the block partition depth of the upper node is K-n) is referred to as an n-th root node of the leaf node, wherein n is an integer within a range of from 1 to K.

For example, referring to FIG. 8, the first root node of a block 1 and a block 2 is a node "BT #1", and the second root node thereof is a node "QT #1". The first root node of nodes "BT #1", "QT #2", and "BT #2" and a block 11 is a node "QT #1". When the block QT #1 is a largest coding unit LCU, the block partition depth of the node "QT #1" is 0, the block partition depth of the nodes "BT #1", "QT #2", and "BT #2" and the block 11 is 1, the block partition depth of the blocks 1 and 2, the nodes "BT #3" and "BT #4", and blocks 5 to 7 and 10 is 2, and the block partition depth of blocks 3, 4, 8, and 9 is 3.

When leaf nodes corresponding to coding units have the same upper root node, the coding units may be grouped as one coding unit group.

For example, when the first root node of certain leaf nodes corresponding to coding units and the first root node of other leaf nodes having the same block partition depth as the certain leaf nodes are the same node, the coding units corresponding to those leaf nodes may be grouped as one coding unit group. That is, when the first root nodes of the leaf nodes corresponding to the coding units are the same node, the coding units may be grouped as one coding unit group.

In this case, referring to FIG. 8, the following coding unit groups may be constructed: a group including the blocks 1 and 2; a group including the blocks 3 and 4; a group including the blocks 5, 6, and 7; a group including the blocks 8 and 9; and a group including the blocks and 11 {(1, 2), (3, 4), (5, 6, 7), (8, 9), (10), (11)}. Alternatively, the following coding unit groups may be constructed: a group including the block 1; a group including the block 2; a group including the blocks 3 and 4; a group including the block 5; a group including the blocks 6 and 7; a group including the blocks 8 and 9; a group including the block 10; and a group including the block 11 {(1), (2), (3, 4), (5), (6, 7), (8, 9), (10), (11)}.

Alternatively, for example, when the second root node of a leaf node having a block partition depth of K and the first root node of a leaf node having a block partition depth of K−1 are the same node, coding units corresponding to those leaf nodes may be grouped as one coding unit group.

In this case, referring to FIG. 8, the root node of the node BT #3 that is the root node of the blocks 3 and 4 having a block partition depth of 3, and the root node of the blocks 5 to 7 having a block partition depth of 2 are the same node "QT #2". That is, the second root node of the blocks 3 and 4 having a block partition depth of 3 and the first root node of the blocks 5 to 7 having a block partition depth of 2 are the same block (the block QT #2). Accordingly, the blocks 3 to 7 may be grouped as one coding unit group. Alternatively, the blocks 3 to 5 may be grouped as one coding unit group.

On the other hand, when the coding unit group may be constructed in consideration of whether prediction modes applied to leaf nodes are identical as well as whether the root nodes of the leaf nodes are the same node.

For example, when the first root node of certain leaf nodes corresponding to coding units and the first root node of other leaf nodes having the same block partition depth as the certain leaf nodes are the same node, some coding units to which an identical prediction mode is applied, among the leaf nodes whose first root node are the same, may be grouped as one coding unit group. When there are leaf nodes that correspond to coding units and whose first root nodes are the same node, some coding units to which an identical prediction mode is applied, among the coding units whose first nodes are the same, may be grouped as one coding unit group.

In this case, referring to FIG. 8, when the blocks 1 and 5 are blocks predicted in the intra-picture prediction mode, and the other blocks are blocks predicted in the inter-picture prediction mode, the following coding unit groups may be constructed: a group including a coding unit 1; a group including a coding unit 2; a group including coding units 3 and 4; a group including a coding unit 5; a group including coding units 6 and 7; a group including coding units 8 and 9; a group including a coding unit 10; and a group including a coding unit 11 {(1), (2), (3, 4), (5), (6, 7), (8, 9), (10), (11)}.

Alternatively, for example, when the second root node of a certain leaf node having a block partition depth of K and the first root node of another leaf node having a block partition depth of K−1 are the same node and when the certain leaf node and the another leaf node are predicted in an identical prediction mode, the coding units corresponding to the certain leaf node and the another leaf node may be grouped as one coding unit group.

In this case, referring to FIG. 8, the root node BT #3 of the blocks 3 and 4 having a block partition depth of 3 and the root node of the blocks 5 to 7 having a block partition depth of 2 are the same node (the node QT #2). Here, when the blocks 3 to 6 are blocks predicted in an identical prediction mode, the blocks 3 to 6 except the block 7 may be grouped as one coding unit group.

When the x-th root node of certain leaf nodes having a block partition depth of K and the y-th root node of other leaf nodes having a block partition depth of K−n (n is an integer within a range of 0 to K−m, wherein m is an integer within a range of 1 to K) are the same node, the encoder may group some leaf nodes of the leaf nodes having the block partition depth of K−n and the leaf nodes having the block partition depth of K as one coding unit group when the some leaf nodes have at least one piece of coding information (for example, information required for intra-picture or inter-picture prediction, primary transform, secondary transform, and quantization), which is the same as that of the leaf nodes having the block partition depth of K.

For example, referring to FIG. 8, among the blocks 3 to 7, when the blocks 3, 4, and 7 have at least one same piece of coding information required for primary transform, the encoder may construct one coding unit group including the blocks 3, 4, and 7 but excluding the block 6.

In addition, among leaf nodes having a block partition depth of K and having the same first root node that has a block partition depth of K−1, some of the leaf nodes, which are predicted in an identical prediction mode and has identical coding information (i.e., information required for intra-picture or inter-picture prediction, primary transform, secondary transform, quantization, or in-loop filtering), may be grouped as one coding unit group.

For example, referring to FIG. 8, among the blocks 5 to 7, when the blocks 5 and 6 have at least one same piece of coding information required for primary transform and are predicted in an identical intra-prediction mode, only the blocks 5 and 6 except the block 7 may be grouped as one coding unit group.

As described above, when one or more coding unit groups are constructed based on information of whether coding units have identical coding information, the encoder may transmit to the decoder information indicating whether the coding units are included in the same coding unit group.

When constructing one or more coding unit groups as described above, coding units that do not satisfy at least any one of the conditions described below may not be included in a coding unit group.

(1) In regards to the block partition depths of the coding units belonging to one coding unit group, a difference (A−B) between the lowest block partition depth A of the coding unit and the highest block partition depth B of the coding unit is equal to or smaller than X (X is any one of 0, 1, 2, . . . , and W, wherein W may mean the value of the maximum block partition depth that can be applied when performing encoding).

(2) A difference between the highest block partition depth B, among the block partition depths B of the coding units included in one coding unit group, and the maximum block partition depth W that can be applied when a current frame is encoded is equal to or smaller than a value Y. Here, Y is any one of 0, 1, 2, . . . , and W.

Hereinbelow, the size (or shape) of the coding unit group will be described.

The size of the coding unit group may be expressed as a block size (for example, a vertical size (length) and a horizontal size (width)), the number of samples of a luma signal and/or a chroma signal included in a block, a block partition depth, or the like.

Here, when one coding unit group has a rectangular form, the size of the coding unit group may be defined as at least one of a block size, the number of samples of a luma signal and/or a chroma signal, and a block partition depth.

Meanwhile, when a coding unit group does not have a rectangular form, the size of the coding unit group may be defined as the sum of the number of samples of a luma signal and/or a chroma signal of each coding unit included in the coding unit group.

The size of one coding unit group may be a variable value determined based on information on the size of one coding unit group, which is signaled from the encoder or a fixed value pre-defined in the encoder/decoder. Alternatively, the size of one coding unit group may be a variable value determined based on at least one of prediction modes of coding units, a flag of a quad-tree partition structure, a flag of a binary-tree partition structure, and a partition depth.

The minimum sizes, the maximum sizes, or both of the minimum sizes and the maximum sizes of the coding unit groups may be equal in a sequence level, a picture level, or a slice level. Accordingly, the encoder may determine the maximum size or the minimum size of each coding unit group and transmit the determined size to the decoder by using at least one of VPS, SPS, PPS, and a slice header.

For example, when the maximum sizes and/or the minimum sizes of the coding unit groups are equal in the sequence level, information on the coding unit groups may be signaled by using at least one of SPS and VPS.

In this case, the information on the coding unit groups may be at least one of flag information indicating whether the maximum sizes and/or the minimum sizes are equal in the sequence level, and information indicating the maximum sizes and/or the minimum sizes.

Alternatively, for example, when the maximum sizes and/or the minimum sizes of the coding unit groups are equal in the picture-level (i.e., frame-level) or the slice-level, the information on the coding unit groups may be signaled to the decoding by using at least one of PPS and a slice header.

In this case, the information on the coding unit groups may be at least one of flag information indicating whether the maximum sizes and/or the minimum sizes are equal in the frame-level and information indicating the maximum sizes and/or the minimum sizes.

Meanwhile, the number of coding units included in one coding unit group may be determined depending on the block size of each coding unit (i.e., the number of samples of a luma signal and or a chroma signal in each coding unit).

For example, when a certain coding unit has a size equal to or larger than a specific block size, the certain coding unit may constitute one coding unit group. That is, the coding unit group includes only one coding unit.

Meanwhile, when a certain coding unit has a size smaller than a specific block size, one coding unit group may consist of at least two coding units existing in the same slice or frame.

The size of one coding unit group may mean a block size or the number of samples or pixels of a luma signal and/or a chroma signal included in one coding unit included in the coding unit group.

In this case, the size of the coding unit group may be equal to or smaller than that of the largest coding unit.

Hereinbelow, a method of transmitting coding information on a coding unit group basis will be described.

The encoder may transmit information on whether a coding unit group is used, information on identification of a coding unit, and information on a type of coding information transmitted on a coding unit group basis, to the decoder.

The information on whether a coding unit group is used may be information indicating whether coding units are grouped into coding unit groups and whether coding information is signaled on a coding unit group basis. When the information on whether a coding unit group is used indicates that coding information is not signaled on a coding unit group basis, coding unit groups may not be constructed but the coding information may be signaled on a coding unit basis.

Among coding units corresponding to leaf nodes whose root nodes are the same node, some of the coding units may not be included in the same coding unit group, and those coding units may be identified by their flag, index, indicator, or identifier transmitted from the corresponding coding units.

For example, referring to FIG. 8, among the root nodes including all of the blocks 3, 4, 6, and 7, the block QT #2 has the deepest block partition depth. Among the leaf nodes of the block QT #2, when the blocks 3, 4, 6, and 7 are included in one coding unit group but the block 5 is not included in the same coding unit group, the flag, index, indicator, or identifier indicating whether each coding unit is included in the coding unit group may be transmitted for each of the coding units 3 to 7 belonging to the root node QT #2.

Meanwhile, coding units corresponding to leaf nodes whose root nodes are the same node, and at least one coding unit corresponding to at least one leaf node whose root node is different from the former root node may be included in one coding unit group. In this case, coding unit group identification information may be transmitted for the coding unit corresponding to the leaf node which does not belong to the same root node.

The information on the type of coding information transmitted on a coding unit group basis may indicate the type of coding information used in the encoding/decoding of coding units belonging to the corresponding coding information group in the case where at least one piece of the coding information transmitted on a coding unit group basis is information for use in the encoding/decoding of the coding units belonging to the coding unit group.

For example, when the information on the type of the coding information transmitted on a coding unit group basis is information on primary transform, the information on the primary transform may be signaled in the units of one coding unit group. Then, the coding units belonging to the coding unit group may be primarily/inversely transformed based on the transmitted information on the primary transform.

All of the coding units included in one coding unit group may be decoded based on at least one of the information on whether a coding unit group is used and the information on the type of the coding information transmitted on a coding unit group basis.

Hereinbelow, a coding information transmission unit according to one embodiment of the present invention will be described below.

The coding information transmission unit may be a coding information signaling unit composed of at least one coding unit group. That is, at least one piece of the coding information of the coding unit groups included in one coding information transmission unit may be transmitted in the units of one coding information transmission unit.

For example, referring to FIG. 8, the blocks 3 to 8 constitute one coding unit group and also constitute one coding information transmission unit.

Alternatively, for example, in FIG. 8, the blocks 3 and 4 may constitute one coding unit group and the blocks 5 to 7 may constitute another coding unit group. In this case, the two coding unit groups constitute one coding information transmission unit.

On the other hand, the coding information transmission unit may include one or more coding units that do not belong to any coding unit group included in the coding information transmission unit. That is, the coding information transmission unit may include at least one coding unit group and at least one coding unit that does not belong to any coding unit group.

For example, referring to FIG. 8, the blocks 3 and 4 constitute one coding unit group #1, the blocks 5 and 6 constitute another coding unit group #2, and the coding information transmission unit may be the block QT #2 including the two coding unit groups #1 and #2. In this case, the block QT #2 may further include the block 7 that belongs to neither the coding unit group #1 nor the coding unit group #2.

Hereinbelow, a method of transmitting coding information on a coding information transmission unit basis will be described.

The encoder may transmit information on whether a coding information transmission unit is used and information on the type of coding information transmitted on a coding information transmission unit basis to the decoder.

The information on whether a coding information transmission unit is used may be information indicating whether there is a coding information transmission unit consisting of one or more coding unit groups and whether the coding information is transmitted in the units of one coding information transmission unit. When the information on whether a coding information transmission unit is used indicates that the coding information is not signaled on a coding information transmission unit basis, the coding information may be signaled on a coding unit basis or a coding unit group basis.

The information on the type of the coding information transmitted on a coding information transmission unit basis may indicate the type of the coding information used for encoding/decoding in the case where at least one piece of the coding information transmitted on a coding information transmission unit basis is used for encoding/decoding the coding unit groups of the coding information transmission unit.

For example, when the information on the type of the coding information transmitted on a coding information transmission unit basis is information on primary transform, the information may be signaled in the units of one coding information transmission unit. Then, the coding units included in the coding unit group included in the coding information transmission unit are primarily/inversely transformed based on the transmitted information on the primary transform.

When one coding information transmission unit includes one or more coding unit groups, the coding information to be transmitted on a coding information transmission unit basis may be transmitted on a coding unit group basis.

For example, the coding information may be transmitted in a way illustrated in FIG. 9.

Referring to FIG. 9, the term "NumUnitGroup" represents the number of coding unit groups included in one coding information transmission unit, the term "i" represents an identifier or index of a coding unit group or information used to identify the coding unit group.

In regards to coding units belonging to an n-th coding unit group included in one coding information transmission unit, the encoder or decoder may obtain coding information required for encoding/decoding of the coding units, from the information transmitted in the units of one coding information transmission unit. To this end, a flag, index, indicator, or identifier that indicates the n-th coding unit group to which the coding units belong may be transmitted for each coding unit.

On the other hand, the size or shape of the coding information transmission unit may be determined in the same way in which the size or shape of the coding unit group is determined.

Hereinabove, the image encoding method and the image decoding method both of which use the coding unit group and the coding information transmission unit have been described. Hereinbelow, a method of deriving coding information of a current coding unit by using coding information of neighboring coding units for efficient signaling of the coding information will be described.

According to one embodiment of the present invention, the coding information of a current coding unit that is to be currently encoded/decoded may be derived from the coding information of the previously encoded/decoded neighboring coding units adjacent to the current coding unit. For an easy description, a method of deriving the coding information of the current coding unit from the coding information of the neighboring coding units is called a coding information merge method or a coding information merge mode.

Hereinbelow, the coding unit to be encoded/decoded is called a current block and the neighboring coding unit is called a neighboring block.

FIG. 10 is a flowchart illustrating an image encoding/decoding method using the coding information merge mode according to the present invention.

Referring to FIG. 10, an encoder/decoder determines whether the coding information merge mode will be used (S1001). When it is determined that the coding information merge mode is used, the encoder/decoder determines a coding information type and at least one neighboring block used to derive the coding information of the current block (S1002). The encoder/decoder may derive the coding information of the current block based on the determined coding information type and the determined neighboring block (S1003). Next, the encoder/decoder may generate a reconstructed block of the current block by using the derived coding information of the current block (S1004).

Hereinafter, each process step will be described in detail.

First, the process Step S1001 of determining whether the coding information merge mode is used will be used described.

Step S1001 may mean a process of determining whether it is necessary to derive the coding information of the current block from the coding information of the previously encoded/decoded neighboring blocks.

The encoder determines whether the coding information merge mode is to be used for the current block, based on an RD cost function. Next, the encoder may transmit an indicator indicating that the coding information of the current block is derived from the coding information of the neighboring block, to the decoder. The decoder may determine whether the coding information of a current coding unit is to be derived from the coding information of a neighboring coding unit by using the indicator.

Alternatively, whether the coding information of a current coding unit is to be derived from the coding information of a neighboring block may be determined based on whether an upper level unit of the current block is split into blocks by a quad-tree/binary-tree partitioning scheme and based on the coding information of the neighboring block.

When it is determined that the coding information merge mode is used in Step S1001, the process Step 1002 of determining a type of coding information and a neighboring block to be used to derive the coding information of the current block may be performed. Hereinbelow, Step S1002 will be described in detail.

Step S1002 may mean the process of identifying the type of the coding information and the neighboring block from which the coding information is to be derived when it is determined that the coding information of the current block is derived from the coding information of the neighboring block. The type of the coding information derived from the neighboring block may be at least one type, and the number of the neighboring blocks used to derive the coding information may be at least one.

The method of determining the type of the coding information for the current block will be described first.

According to one embodiment of the present invention, the type of the coding information required for the current block may be determined based on the information indicating a maximum of N coding information types that need to be derived. The information indicating a maximum of N coding information types that need to be derived may be signaled to the decoder. The information indicating a maximum of N of coding information types that need to be to be derived may be defined as indicators (for example, flags, indicators, indexes) or identifiers.

According to another embodiment of the present invention, the information indicating a maximum of N coding information types that need to be derived may not be signaled. An arbitrary method may be used to determine the types of the coding information that needs to be derived.

For example, the maximum of N coding information types may be fixed coding information types.

For example, some types of the coding information of the current block, which are not directly signaled to the decoder, may be determined as the types of the coding information to be derived from the neighboring blocks. When reference picture index information of the current block is not signaled, at least one type of the coding information to be derived from the neighboring blocks may be the reference picture index information.

The maximum number of the types of the coding information to be derived from the coding information of the neighboring blocks may be N, where N is an arbitrary integer larger than 0. The N is a preliminarily fixed value that is commonly used in the encoder and the decoder. Alternatively, the N is set to a specific integer value set by the encoder, and information from which the value can be derived may be transmitted to the decoder so that the decoder can derive the specific value from the transmitted information.

The N may be a variable value determined depending on the attributes of the current block. The attributes may mean a size/shape, a depth, a partitioning method, a mode for prediction, a type of transform, a count of transform, skip or use of transform, a quantization parameter, and the like.

Next, a method of determining at least one neighboring block from which at least one piece of the coding information of the current block is derived will be described. The neighboring blocks may mean spatial neighboring blocks that are spatially adjacent to the current block and temporal neighboring blocks that are temporally adjacent to the current block, and they may mean encoded/decoded blocks.

Figure 11:
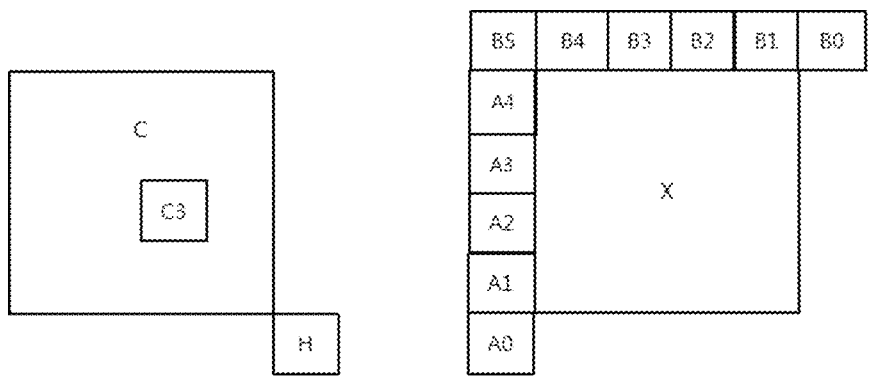
FIG. 11 is a diagram used to describe neighboring blocks of a current block according to one embodiment of the present invention.

FIG. 11 is a diagram illustrating neighboring blocks of one current block.

The spatial neighboring blocks are blocks located above and on the left side of the current block. When a position of an upper left corner pixel of the current block is set to (0, 0) and a position of a lower right corner pixel is set to (P1, P2), above neighboring blocks are blocks including a pixel located at a position (P, −1) (wherein, P is in a range of −1<=P=<P1+1) and left-hand neighboring blocks are blocks including a pixel located at a position (−1, P) (wherein, P is in a range of −1<=P<=P2+1). In addition, the left-hand and right-hand neighboring blocks may mean multiple blocks including some pixels in a predetermined distance from the current block in a horizontal direction and a vertical direction, among the pixels adjacent to the current block.

Referring to FIG. 11, when the current block is assumed to be a block X, the spatial neighboring blocks include blocks A0 to A4 and B0 to B5.

The temporal neighboring blocks of the current block are blocks that exist within reference pictures to which a current picture including the current block refers and which are located at spatially similar positions to the current block. A picture that is the most similar to the current picture is called a co-located picture (or COL picture) and a block that is located spatially at the most similar position to the current block within the most similar picture is called a co-located block (or COL block).

The most similar picture to the current picture is a first entry picture (indicated by a reference picture index of 0) in a reference picture list of the current block, or a picture that is temporally closest to the current picture. Alternatively, the encoder may encode and signal information indicating a picture that is the most similar to the current picture, and the decoder may determine a picture including a block that is temporally adjacent to the current block, based on the signaled information. The information indicating the most similar picture may be signaled in at least one of a sequence level, a picture level, a slice level, and a block level.

The most spatially similar block to the current block may be at least any one of a block located spatially at the same position as the current block, a block including a region located at the same position as a center point of the current block, a block (for example, a block C3 in FIG. 11) including a pixel located at a position moved rightward by one pixel and then downward by one pixel from the center point of the current block, and a block (for example, a block H in FIG. 11) including a pixel located at a position moved rightward by one pixel and then downward by one pixel from the lower right corner pixel of the current block. Alternatively, the most spatially similar block may be at least any one of blocks adjacent to the left end of the current block, blocks adjacent to the right end of the current block, blocks adjacent to the upper end of the current block, blocks adjacent to the lower end of the current block, and blocks adjacent to each corner of the current block.

The spatially similar block described above is an example of a candidate from which the coding information of the current coding unit can be derived. The coding information of the current coding unit may be derived from the coding information of the M blocks of the N candidates, wherein N>=M, and N and M are natural numbers. To this end, a candidate list including the N candidates may be generated, and identifiers to identify the N candidates may be signaled.

The maximum number of neighboring blocks may be M, wherein M is an arbitrary integer larger than 0. The M may be a preset value and may be commonly used in the encoder and the decoder.

Alternatively, the encoder may set the M to a specific integer value, and transmit information from which the specific integer value can be derived to the decoder, and the decoder may derive the M from the transmitted information.

The encoder may signal information indicating a maximum of M neighboring blocks that are candidates used to derive the coding information of the current block, thereby enabling the decoder to identify the corresponding neighboring blocks.

Alternatively, the encoder may not signal the information indicating a maximum of M neighboring blocks from which the coding information of the current block can be derived, but the decoder may identify the neighboring blocks from which the coding information of the current block can be derived by using an arbitrary method.

Hereinbelow, an embodiment of a method of identifying a neighboring block from which the coding information of the current block will be derived by an arbitrary method will be described.

(1) The neighboring blocks from which the coding information of the current block can be derived may be a predetermined number of blocks among neighboring blocks adjacent to the current block. For example, referring to FIG. 11, K neighboring blocks among the blocks A0 to A4, B0 to B5, C3, and H may be used to derive the coding information of the current block, wherein the K is a predetermined integer larger than zero.

(2) The neighboring blocks used to derive the coding information of the current block are blocks determined according to arbitrary conditions. Neighboring blocks of the current block are scanned in a predetermined order, so that the neighboring blocks having a target coding information type that needs to be derived or the neighboring blocks having similarity to the current block may be regarded as the neighboring blocks used to derive the coding information of the current block.

For example, referring to FIG. 11, the blocks adjacent to the current blocks are scanned in the order of "B0", "B1", "B2", "B3", "B4", "B5", "A4", "A3", "A2", "A0", "C3", and "H", and M blocks having the coding information type that needs to be derived for the current block, among those blocks, are determined as the neighboring brocks used to derive the coding information of the current block. The blocks may be scanned in a different scanning order.

(3) Neighboring blocks spatially adjacent to the current block are arranged in a predetermined order, and M neighboring blocks counted from a first neighboring block having coding information that can be used as to coding information of the current block, among the sequentially arranged neighboring blocks, are determined as the neighboring blocks that can be used to derive the coding information of the current block.

For example, the neighboring blocks may be arranged in the order from the above rightmost block to the above leftmost block and then from the bottom left-hand block to the top left-hand block.

Alternatively, for example, the neighboring blocks may be arranged in the order from the above rightmost block to the above leftmost block and then from the top left-hand block to the bottom left-hand block.

Further alternatively, for example, the neighboring blocks may be arranged in the order from the bottom left-hand block to the top left-hand and then from the above leftmost block to the above rightmost block.

(4) When there is a certain neighboring block having coding information the same as that of the current block besides the coding information type that needs to be derived, the neighboring block is determined to have similarity to the current block. In this case, the neighboring block may be regarded as the neighboring block from which at least one piece of the coding information of the current block can be derived.

For example, when a mode of intra-picture prediction of the current block is the same as that of intra-picture prediction of at least one neighboring block, the neighboring block has similarity to the current block. Accordingly, the neighboring block may be regarded as the neighboring block from which at least one piece (for example, information required for primary transform) of the coding information of the current block can be derived.

Alternatively, for example, when a mode that is the same as the mode of the intra-picture prediction of the current block is included in an MPM list and there is a coding unit having the same mode, among the neighboring blocks of the current block, the current block is determined to have similarity to the neighboring block. Accordingly, the neighboring block is regarded as one of the neighboring blocks from which at least one piece (for example, information required for primary transform) of the coding information for the current block can be derived.

Further alternatively, for example, in the case of intra encoding, when the mode of the intra-picture prediction of the current block is the same as the mode of the intra-picture prediction of at least one neighboring block and when the mode of the intra-picture prediction of the neighboring block is not included in the MPM list or is a non-directional mode (for example, DC mode, planar mode, or the like), the current block is determined to have similarity to a coding unit corresponding to the neighboring block. Accordingly, the neighboring block may be regarded as the neighboring block from which at least one piece (for example, information required for primary transform) of the coding information of the current block can be derived.

Yet further alternatively, for example, in the case of inter encoding, when the current block is encoded in a merge mode (motion merge mode), and when a merge candidate within a merge candidate list used to derive motion information of the current block is one of the neighboring blocks of the current block, the current block is determined to have similarity to the neighboring block. Accordingly, at least one piece of the coding information of the current block can be derived from the coding information of the neighboring block.

(5) An array in which neighboring blocks are arranged in predetermined order may be referred to as a neighboring block set A. An array of neighboring blocks having similarity to the current block may be referred to as a neighboring block set B. In this case, at least one block that is included in the neighboring block set B also may be included in the neighboring block set A. The neighboring blocks in the neighboring block set A are sequentially scanned to find M neighboring blocks that also belong to the neighboring block set B. The found M neighboring blocks that are included in both of the neighboring block set A and the neighboring block set A may be determines as neighboring blocks from which the coding information of the current block can be derived.

For example, when the coding information of the current block is derived from the coding information of the neighboring block, when the mode of the intra-picture prediction of the current block is included in the MPM list, and when P or more neighboring blocks (i.e., the neighboring blocks in the neighboring block set B, wherein P is the number of neighboring blocks and is larger than M) among all of the neighboring blocks of the current block have the same mode of the intra-picture prediction of the current block, neighboring blocks spatially adjacent to the current block may be arranged in a certain order, and the neighboring blocks ranging from the first to M-th neighboring blocks arranged in the neighboring block set B may be determined as the neighboring blocks from which the coding information of the current block can be derived.

Here, in the case where the neighboring blocks spatially adjacent to the current block are arranged in a certain order, the neighboring blocks may be arranged in the same order in which the modes of the intra-picture prediction of the neighboring blocks are checked to construct the MPM list of the spatial neighboring blocks and to derive the mode of the intra-picture prediction of the current block. For example, the neighboring blocks spatially adjacent to the current block may be arranged in the order from the above rightmost neighboring block to the above leftmost neighboring block and then from the bottom left-hand neighboring block to the top left-hand neighboring block. Alternatively, the neighboring blocks may be arranged in the order from the above rightmost neighboring block to the above leftmost neighboring block and then from the top left-hand neighboring block to the bottom left-hand neighboring block. Alternatively, the neighboring blocks may be arranged in the order from the bottom left-hand neighboring block to the top left-hand neighboring block and then from the above leftmost neighboring block to the above rightmost neighboring block.

In Step S1003, the coding information of the current block may be derived based on the coding information type and the neighboring block both of which are determined in Step S1002. Hereinbelow, Step S1003 will be described in detail.

When specific coding information of the current block is derived from a specific neighboring block, the coding information of the current block may be the same as the coding information of the specific neighboring block.

When specific coding information of the current block is derived from a plurality of neighboring blocks, the coding information of the current block may be at least one of a mean value, a median value, a minimum value, a maximum value, and a weighted sum of the coding information of the plurality of neighboring blocks.

When the coding information of a current coding unit is not derived from the coding information of a neighboring coding unit, the coding information of the current coding unit may be entropy-encoded and then transmitted to the decoder, and the decoder may use the transmitted coding information to reconstruct the current coding unit by performing on entropy decoding on the encoded current coding unit.

In Step S1004, a process of generating a reconstructed block of the current block by using the coding information of the current block, which is derived in Step S1003, may be performed. Hereinbelow, the process of Step S1004 will be described in detail.

The encoder/decoder may generate a reconstructed block through the following processes using at least one piece of the coding information:

performing intra-prediction or inter-prediction to generate a prediction block;

performing an inverse process to primary and/or secondary transform, and dequantization to generate a residual block; and performing in-loop filtering on the prediction block and the residual block to generate a reconstructed block.

Hereinbelow, an image decoding method and an image encoding method according to embodiments of the present invention will be described with reference to FIGS. 12 and 13.

Figure 12:
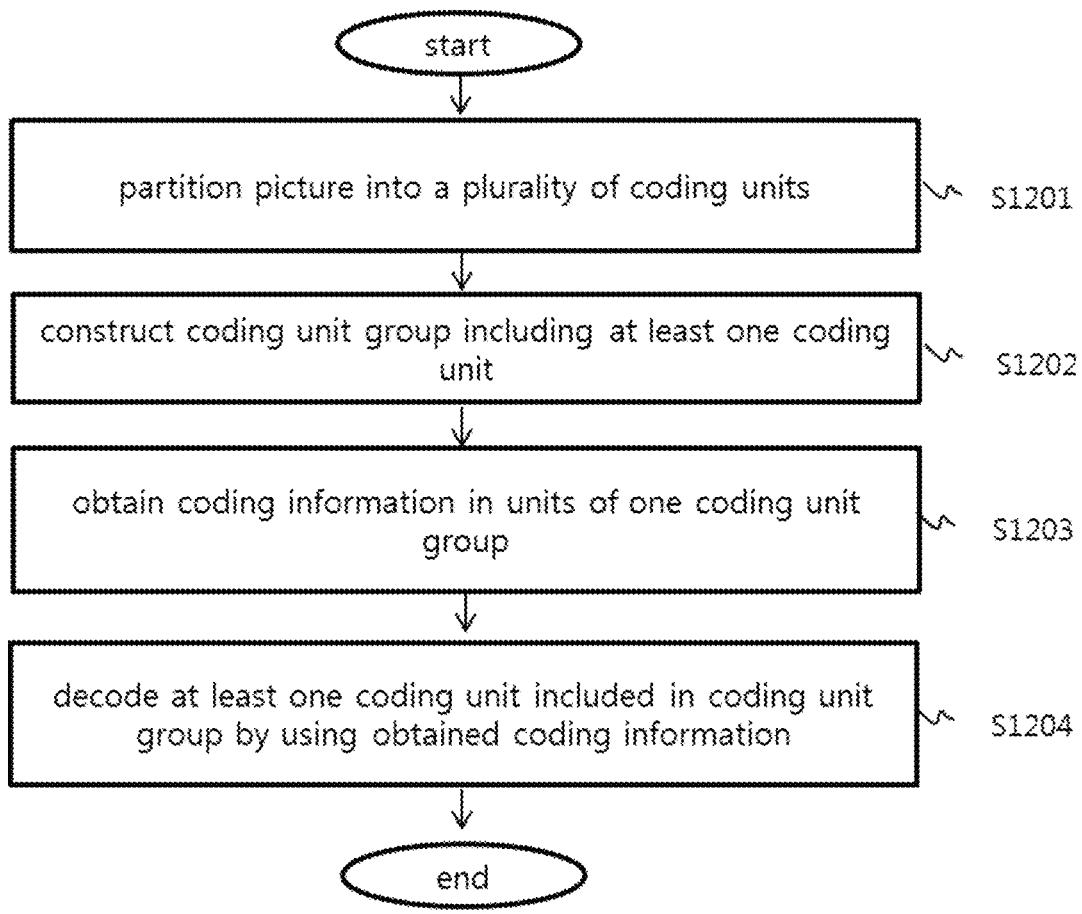
FIG. 12 is a flowchart illustrating an image decoding method according to one embodiment of the present invention.

FIG. 12 is a diagram illustrating the image decoding method according to the embodiment of the present invention.

Referring to FIG. 12, the decoder partitions a picture into a plurality of coding units (S1201). Here, the decoder may partition a picture into a plurality of coding units using at least one of a quad-tree partitioning scheme and a binary-tree partitioning scheme. In this case, the coding units of the plurality of coding units correspond to leaf nodes in at least one of a quad-tree partition structure and a binary-tree partition structure.

Alternatively, the decoder may partition a picture into a plurality of coding units based on block partition information that is described above with reference to FIG. 3.

Next, the decoder may construct a coding unit group including at least one of the coding units (S1202).

When constructing the coding unit group, the size of the coding unit group may be defined as at least any one of a block size, the number of samples of a luma or chroma signal, and a partition depth, and the minimum or maximum size of the coding unit group may be signaled as a slice header.

The encoder may construct a coding unit group such that the coding unit group includes coding units that are consecutive in encoding order and which have an identical prediction mode.

The encoder may construct a coding unit group such that the coding unit group includes coding units corresponding to leaf nodes whose root nodes are the same node. In this case, the decoder may construct a coding unit group such that the coding unit group includes only the coding units having an identical prediction mode, among the coding units corresponding to the leaf nodes whose root nodes are the same node.

Next, the decoder may obtain the coding information in the units of one coding unit group (S1203). The obtained coding information may be coding information required for at least one of a prediction method, intra-picture prediction, inter-picture prediction, primary inverse transform, secondary inverse transform, dequantization, and in-loop filtering.

The decoder may obtain the coding information, based on information on the type of the coding information transmitted in the units of one coding unit group.

The decoder may further perform a process of constructing a coding information transmission unit including at least one coding unit group. In this case, in the process of obtaining the coding information in the units of one coding unit group, the decoder may obtain the coding information in the units of one coding unit group from the coding information that is signaled in the units of one coding information transmission unit.

Next, the decoder may decode at least one coding unit of the coding units included in the coding unit group by using the obtained coding information (S1204).

Figure 13:
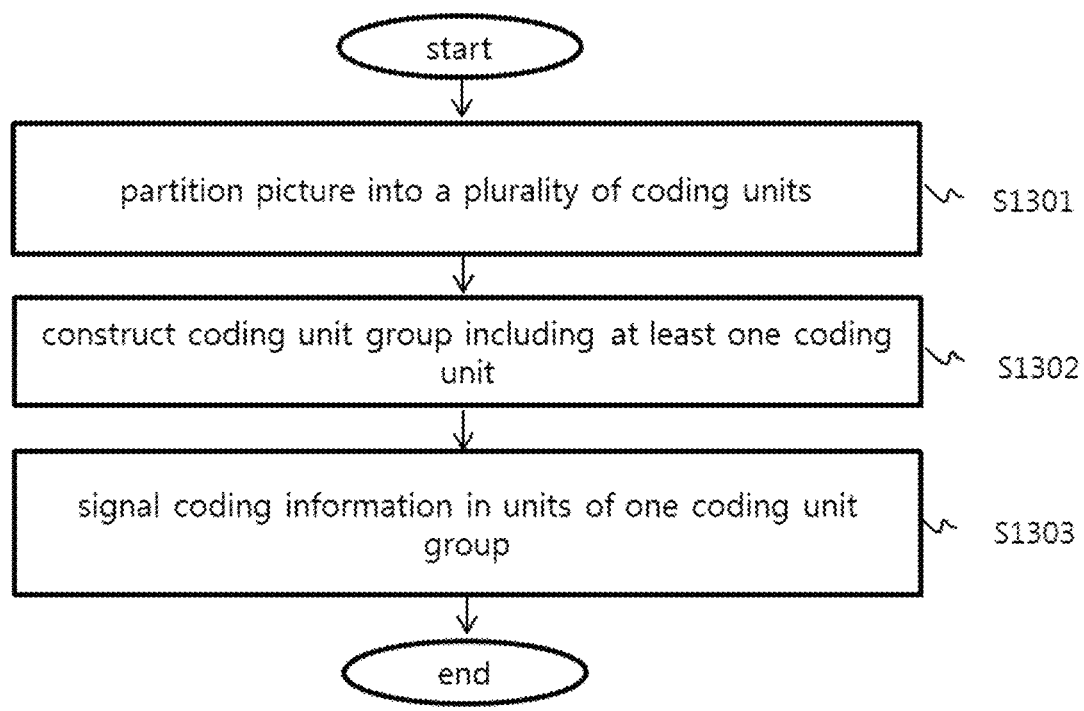
FIG. 13 is a flowchart illustrating an image encoding method according to one embodiment of the present invention.

FIG. 13 is a diagram illustrating an image encoding method according to one embodiment of the present invention.

Referring to FIG. 13, an encoder may partition a picture into a plurality of coding units using at least one of a quad-tree partitioning scheme and a binary-tree partitioning scheme (S1301). The coding units may correspond to leaf nodes provided based on at least one of a quad-tree partition structure and a binary-tree partition structure.

The encoder may construct a coding unit group including at least one of the plurality of coding units (S1302), and signal coding information in the units of one coding unit group (S1303).

The above embodiments may be performed in the same method in an encoder and a decoder.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type to which the above embodiments of the present invention are applied may be defined, and the above embodiments may be applied depending on the corresponding slice type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention can be used in an image encoding apparatus or an image decoding apparatus.

The invention claimed is:

1. A method for decoding an image, the method comprising:
  constructing a coding unit group including at least one of a plurality of coding units divided from the image;
  obtaining coding information of the coding unit group; and
  decoding at least one of the plurality of coding units included in the coding unit group by using the coding information,
  wherein the coding information is determined based on a size of the coding unit group,
  wherein the plurality of coding units are decoded based on the coding information of the coding unit group,
  wherein prediction modes of the plurality of coding units included in the coding unit group are determined to be an identical prediction mode,
  wherein the identical prediction mode of the plurality of coding units in the coding unit group is determined to be an intra prediction mode based on the coding information,
  wherein the plurality of coding units constructing the coding unit group have a continuous coding order, and
  wherein the coding unit group and the plurality of coding units have a square shape.

2. A method of encoding an image, the method comprising:
  constructing a coding unit group including at least one of a plurality of coding units divided from the image; and
  signaling coding information of the coding unit group,
  wherein the coding information is determined based on a size of the coding unit group,
  wherein the plurality of coding units are encoded, the coding information being determined based on the plurality of coding units,
  wherein prediction modes of the plurality of coding units included in the coding unit group are determined to be an identical prediction mode,
  wherein the identical prediction mode of the plurality of coding units in the coding unit group is determined to be an intra prediction mode,
  wherein the plurality of coding units constructing the coding unit group have a continuous coding order, and
  wherein the coding unit group and the plurality of coding units have a square shape.

3. A method of transmitting a bitstream generated by an encoding method, the encoding method comprising:
  constructing a coding unit group including at least one of a plurality of coding units divided from the image; and
  signaling coding information of the coding unit group into the bitstream,
  wherein the coding information is determined based on a size of the coding unit group,
  wherein the plurality of coding units are encoded, the coding information being determined based on the plurality of coding units,
  wherein prediction modes of the plurality of coding units included in the coding unit group are determined to be an identical prediction mode,
  wherein the identical prediction mode of the plurality of coding units in the coding unit group is determined to be an intra prediction mode,
  wherein the plurality of coding units constructing the coding unit group have a continuous coding order, and
  wherein the coding unit group and the plurality of coding units have a square shape.

* * * * *